March 31, 1970 R. L. HALL ET AL 3,504,335
AIRCRAFT TAKE-OFF MONITORING SYSTEM
Filed Aug. 14, 1967 3 Sheets-Sheet 1

INVENTORS:
ROBERT L. HALL
ROLAND H. SIEBENS
BY
THOMAS COOCH
JOSEPH J. ALEKSHUN, JR.
ATTORNEYS

INVENTORS:
ROBERT L. HALL
ROLAND H. SIEBENS

BY
THOMAS COOCH
JOSEPH J. ALEKSHUN, JR.
ATTORNEYS

March 31, 1970  R. L. HALL ET AL  3,504,335
AIRCRAFT TAKE-OFF MONITORING SYSTEM
Filed Aug. 14, 1967  3 Sheets-Sheet 3

VALUE HOLDER CIRCUIT

INVENTORS:
ROBERT L. HALL
ROLAND H. SIEBENS
BY
THOMAS COOCH
JOSEPH J. ALEKSHUN, JR.
ATTORNEYS

United States Patent Office 3,504,335
Patented Mar. 31, 1970

3,504,335
AIRCRAFT TAKE-OFF MONITORING SYSTEM
Robert L. Hall, Marblehead, Mass., and Roland H. Siebens, Wheaton, Ill., assignors to Massachusetts Institute of Technology, Cambridge, Mass., a corporation of Massachusetts
Filed Aug. 14, 1967, Ser. No. 660,282
Int. Cl. G01c 21/00
U.S. Cl. 340—27
14 Claims

ABSTRACT OF THE DISCLOSURE

A system for monitoring the take-off performance of an aircraft and for providing information to the pilot to aid him in his take-off decision in which a first quantity representing the total distance from the start of take-off to the aircraft's present position on the runway plus the predicted distance required to stop from that position from the aircraft's present velocity and a second quantity representing the total distance from the start of take-off to the aircraft's predicted position at which it will have reached its commitment velocity plus the predicted distance to stop from such velocity are each compared with the total safe runway distance available for take-off. In addition, a third quantity representing the distance from the start of take-off to the aircraft's future position at which it will have reached its take-off velocity is compared with the total runway distance less the minimum aircraft climb-out distance required to clear the end of the runway with a single engine loss. Appropriately displayed information is derived from such comparisons, which are repetitively made with the aid of high speed computers, in order to indicate as early as possible in the take-off run whether the take-off should be continued or discontinued.

---

This invention relates generally to systems for monitoring the performance of aircraft and, more particularly, to the instrumentation of an improved system for measuring, evaluating and indicating aircraft performance during the take-off run.

Since runway lengths available for take-off are necessarily limited, members of the flight crew and particularly the pilot of the aircraft must decide at some point during the take-off run whether to continue or to abort the take-off. Under present take-off procedures the pilot is called upon to exercise considerable personal judgment in making such decisions based on control panel indications of aircraft operation as well as on his ability to see the runway and visually estimate the environmental conditions and the distances and speeds involved.

Under marginal conditions where the pilot does not have sufficient information to make a clear judgment of the situation his decision becomes extremely critical. Continuation of the take-off may lead to a disastrous crash while abortion thereof may produce less catastrophic yet serious effects on airport operations and passenger reactions as well as create possible strain and damage to the aircraft itself. Hence, it is desirable to reduce the necessity for personal judgment of the pilot to a minimum and in cases where such judgment is unavoidable to further minimize the possibility of error on his part.

The system of this invention provides the pilot with easily readable panel indications of the aircraft's present position and certain of the aircraft's predicted future positions under the existing take-off conditions so that a decision to take off or to abort can be made as early as possible during the take-off run. The system includes an acceleration measuring means and real-time computer means for determining the aircraft's present acceleration and for calculating its present velocity and position on the runway together with high speed computer means for predicting from such real-time information the aircraft's operating velocity and position at future points in time at critical positions along the runway so that appropriate information for making a take-off or abort decision can be readily and continuously displayed for pilot observation.

In making such a decision the system takes into account actual and predicted aircraft operation both prior to and after reaching a specified "commitment velocity" conventionally designated as $V_1$. $V_1$ is defined as the velocity at which, if one engine of a multi-engine aircraft should fail, the aircraft either could attain the required take-off height at the end of the runway or could come to a complete stop before reaching the end of the take-off surface. The selection of the value of such commitment velocity $V_1$ depends on the particular aircraft involved and, for any particular aircraft, $V_1$ can be calculated prior to take-off in accordance with well-known procedures.

The system of the present invention provides an improved method for aiding the pilot in his take-off decision by deriving information concerning present and predicted aircraft positions and runway conditions primarily based upon an accurate measurement of the aircraft's forward acceleration and supplying him with a clear indication of whether to continue or to abort his take-off run based on such information. In such system, a high-speed computer subsystem, utilizing input quantities obtained from a real-time computer subsystem and from ground calculations made prior to take-off, predicts the expected values of three critical distance quantities. The first quantity represents the total distance from the start of take-off to the aircraft's present position on the runway plus the predicted distance required to stop from that position from the aircraft's present velocity. The second quantity represents the total distance from the start of take-off to the aircraft's predicted future position at which it will have reached the commitment velocity $V_1$ plus the predicted distance required to stop from such position from such velocity. The third quantity represents the total distance from the start of take-off to the aircraft's predicted future position at which it will have reached its take-off velocity designated herein as $V_2$. The take-off or abort decision is based on a comparison of the first and second distance quantities with the total safe runway distance available for take-off, i.e., the total runway distance less an arbitrary safety-margin distance, and on a comparison of the third quantity with the total runway distance less the minimum climb-out distance required for the aircraft to take off and clear obstacles at the end of the runway under single-engine loss conditions. Such comparisons are discussed in more detail with particular reference to the Take-off and Abort Conditions (1) through (7) listed below.

Once such comparative relationships are determined, suitable instrumentation is provided to display the results of such determination to the pilot in an easily readable fashion. In the system of the invention some of the parameters used therein are calculated as appropriate constants prior to take-off, others can be continuously measured by available airborne instrumentation and others are continuously calculated by airborne real-time computer subsystem equipment or airborne high-speed computer subsystem equipment. Although not necessarily limited thereto, the overall monitoring system can be arranged to be independent of other measurement equipment and systems already present in the aircraft and can be made and used as a self-contained, airborne unit not requiring continuous ground-fed data for its operation.

The specific system and the operation thereof is described more completely with the help of the following drawings in which.

Figure 1:
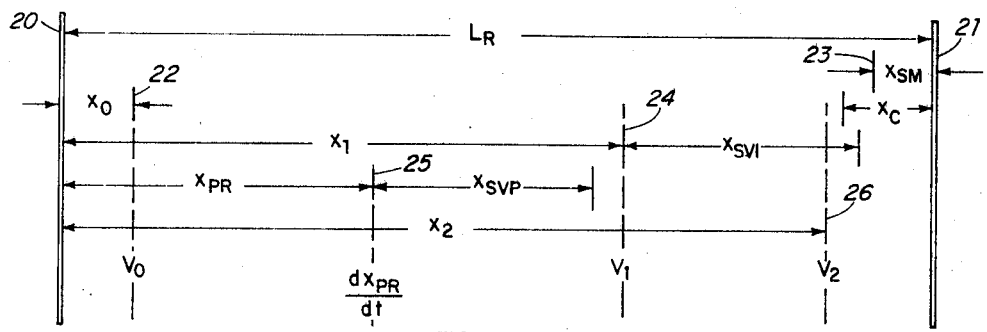
FIG. 1 shows a diagrammatic illustration of the various distances and velocities involved during the aircraft's take-off run along the runway.

The following distance and velocity definitions will aid in understanding the configuration and operation of the system of the invention. Such quantities and their relationship to the runway distances involved are diagrammatically illustrated in FIG. 1 wherein:

$L_R$ designates the length of the complete runway from a first end line 20 near the start of the take-off run to a second end line 21 at the opposite end of the runway near the end of the take-off run;

$X_0$ designates the distance from end line 20 to the point 22 at which the aircraft starts its take-off run (i.e., at time equal to zero);

$X_{SM}$ designates the distance from end line 21 of the runway to a nearby point 23 and represents an arbitrary safety-margin distance;

$X_C$ designates the minimum distance required for climb-out under conditions where a multi-engine aircraft is operating under the loss of a single engine to assure that the aircraft will clear the height of the tallest obstacles located at end line 21 of the runway;

$V_1$ designates the "commitment velocity" as defined above;

$X_1$ designates the distance from end line 20 of the runway to the point 24 on the runway at which the velocity $V_1$ ns reached.

$X_{SV1}$ designates the predicted distance required for the aircraft to come to a stop from a velocity $V_1$;

$X_{PR}$ designates the distance from end line 20 of the runway to the present position 25 of the aircraft during take-off;

$dX_{PR}/dt$ designates the present velocity of the aircraft during take-off;

$X_{SVP}$ designates the predicted distance required for the aircraft to come to a stop from the velocity $dX_{PR}/dt$;

$V_2$ designates the take-off velocity of the aircraft; and $X_2$ is the distance from end line 20 of the runway to the point 26 on the runway at which the take-off velocity $V_2$ is reached.

Figure 2:
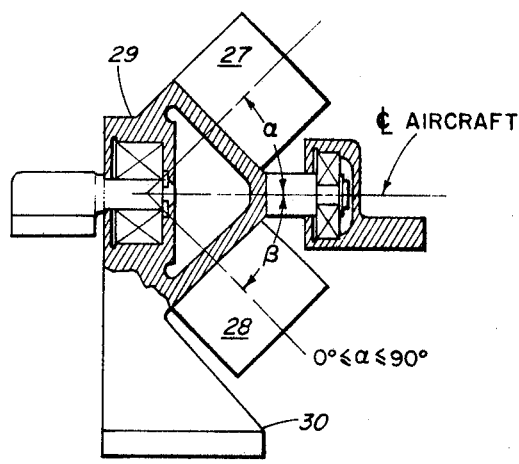
FIG. 2 shows a partial cross section of the accelerometer mounting system used to measure the aircraft's forward acceleration.

In the system of the invention the basic quantity required to determine the necessary parameters for indicating aircraft performance is the horizontal acceleration of the aircraft in the forward direction along the runway as the aircraft proceeds from its take-off starting position at $X_0$ toward end line 21 thereof. If a single-axis accelerometer is used to measure such forward acceleration, the accelerometer output will be affected by pitching, rolling and yawing motions of the aircraft as it proceeds down the runway and by the presence of components of acceleration due to gravity unless such accelerometer is mounted on a suitable stabilized platform. Such factors tend to introduce measurement errors into the system which may cause the output signal to lie outside the accuracy limits desired for the system. In order to avoid such errors in the measurement of acceleration, while at the same time permitting at least a limited rotation of the aircraft about its pitch and roll axes, and in order to avoid the use of an elaborate and expensive stabilized platform system, a dual accelerometer system of the configuration shown in FIG. 2 can be utilized. The effects of yawing motions can be eliminated by a proper location of the accelerometers on the aircraft.

In such structure two accelerometers 27 and 28 are suitably attached to a mounting structure 29 so that their input axes lie in a vertical plane along the center line of the aircraft and are substantially perpendicular to each other. A pendulous mass 30 is attached at the bottom of mounting structure 29 and operates to retain the accelerometer input axes in the vertical plane in the face of rotation of the aircraft about its roll axis. Since a change in acceleration due to aircraft roll is a function of the cosine of the roll angle, small variations in the roll angle (i.e., the aircraft rolls no more than a few degrees in either direction from the vertical) produces minimal variations in accelerometer outputs. Thus, under conditions where the aircraft is expected to roll only very slightly during the take-off run, pendulous mass 30 may be omitted altogether without producing variations in the accelerometer output signals outside the desired accuracy specifications.

Accelerometers 27 and 28 each measure accelerations along the directions of their input axes, which axes are arranged at installation to form any appropriate fixed angles with the center line of the aircraft (so long as they are substantially perpendicular to each other, as mentioned above). During aircraft operation such input axes form angles $\alpha$ and $\beta$, respectively, with the horizontal axis and, consequently, while $\alpha$ and $\beta$ vary during take-off, the quantity $(\alpha+\beta)$ remains essentially equal to 90°. In the drawing the horizontal axis and the aircraft center line are shown as coinciding, although such coincidence is not necessarily maintained during take-off.

Figure 3:
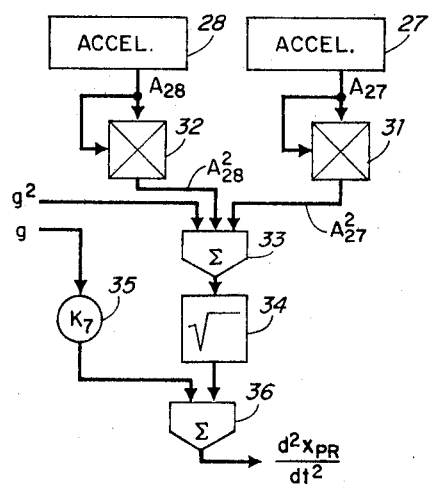
FIG. 3 shows a block diagram of the real-time acceleration measuring subsystem of the invention.

With reference to FIG. 3 the output signal $A_{27}$ from accelerometer 27 is fed to the input terminals of a suitable multiplier circuit 31 which produces an output signal $A_{27}^2$ representing the square of the accelerometer input signal. The output signal $A_{28}$ from accelerometer 28 is similarly fed to the input terminals of a second multiplier circuit 32 for producing an output signal $A_{28}^2$. These signals are then fed to the input terminals of a suitable summation amplifier 33 together with a signal $g^2$ representing the square of the acceleration $g$ due to gravity. The output of summation amplifier 33 is then fed as an input signal to a suitable means 34 for obtaining the square root of such input signal, the output of means 34 thereby representing the present aircraft horizontal acceleration $$d^2X_{PR}/dt^2$$

as measured in real-time, so long as the overall average slope of the runway is zero (i.e., the runway is essentially level). When the overall average slope of the runway is positive or negative, an appropriate correction factor equal to $(K_7g)$ is introduced as shown. The signal $g$ is multiplied by $K_7$ at coefficient amplifier 35 and then fed to one input of summation amplifier 36 the other input of which is obtained from square-root means 34. The output of summation amplifier 36 thereby represents the acceleration corrected for runway slope characteristics.

The operation of the overall accelerometer computer subsystem shown in the block diagram of FIG. 3 is most easily understood with the help of the following equations.

The output signals from accelerometers 27 and 28 may be written as follows:

$$A_{27} = g \sin \alpha + \frac{d^2 X_{PR}}{dt^2} (\cos \alpha) \quad (1)$$

$$A_{2b} = g \sin \beta - \frac{d^2 X_{PR}}{dt^2} (\cos \beta) \quad (2)$$

where each of the symbols has been previously defined. Since $(\alpha + \beta)$ equals $90°$, Equation 2 can be rewritten as follows:

$$A_{28} = g \cos \alpha - \frac{d^2 X_{PR}}{dt^2} (\sin \alpha) \quad (3)$$

If Equations 1 and 3 are each squared and the results are added, the following expression is obtained:

$$A_{27}^2 + A_{28}^2 = g^2(\sin^2 \alpha + \cos^2 \alpha) + \left(\frac{d^2 X_{PR}}{dt^2}\right)^2 (\sin^2 \alpha + \cos^2 \alpha) \quad (4)$$

Since $(\sin^2 \alpha + \cos^2 \alpha) = 1$, Equation 4 can be simplified as follows:

$$A_{27}^2 + A_{28}^2 = g^2 + \left(\frac{d^2 X_{PR}}{dt^2}\right)^2 \quad (5)$$

The values of angles $\alpha$ and $\beta$ will vary as the aircraft rotates about its pitch axis. However, since the quantities $\alpha$ and $\beta$ are eliminated in Equation 5, any changes in such angles due to minor pitching of the aircraft will not affect the accuracy of the measurement of aircraft acceleration which then can be expressed in accordance with the following equation:

$$\frac{d^2 X_{PR}}{dt^2} = \sqrt{A_{27}^2 + A_{28}^2 - g^2} \quad (6)$$

The functional mechanization of Equation 6 is shown in the block diagram of FIG. 3 with an appropriate correction being subsequently made at summation amplifier 36 for runway slope as discussed above. Further minimization of the errors involved can be achieved by mounting the accelerometers on substantially non-vibratory structures so that vibrations are reduced.

Thus, FIG. 3 describes a real-time computer subsystem for measuring the basic quantity required for the overall take-off monitoring system of the invention, i.e., a measurement of the horizontal, or forward, acceleration of the aircraft as it proceeds down the runway during its take-off run.

The overall operation of the remaining computer subsystems of the invention can be best explained with the help of the block diagrams shown in FIGS. 4, 5, 6, 7 and 8. In describing the functions performed by the mechanization of the system in such figures the following additional quantities can be defined:

M designates the mass of the aircraft during take-off;

$\mu_R$ designates the present coefficient of rolling friction of the aircraft as calculated in real-time;

W designates the weight of the aircraft and is equivalent to the quantity (Mg);

$L_A$ designates the lift of the aircraft;

$C_D$ designates the drag coefficient of the aircraft;

$C_L$ designates the lift coefficient of the aircraft;

S designates the wing area of the aircraft;

$\delta$ designates the air density;

$f_{PR}(t)$ designates the present engine thrust as a function of time;

$\mu_S$ designates the coefficient of dynamic friction under braking conditions, sometimes hereinafter referred to as the braking coefficient;

$\mu_{S2}$ designates an arbitrary maximum value for such braking coefficient as discussed below with reference to Equation 11;

$V_W$ designates the relative wind velocity in the direction of take-off as measured with the aircraft at zero velocity;

$dX_r/d\tau$ generally represents a high-speed computed value of velocity, the use of which is discussed more particularly below;

$X_r$ generally represents a high-speed computed value of distance, the use of which is discussed more particularly below; and $X_1$ designates the high-speed computed value of the distance required to reach the commitment velocity $V_1$; and $X_2$ designates the high-speed computed value of the distance required to reach the take-off velocity $V_2$ assuming loss of one engine at $V_1$.

Figure 4:
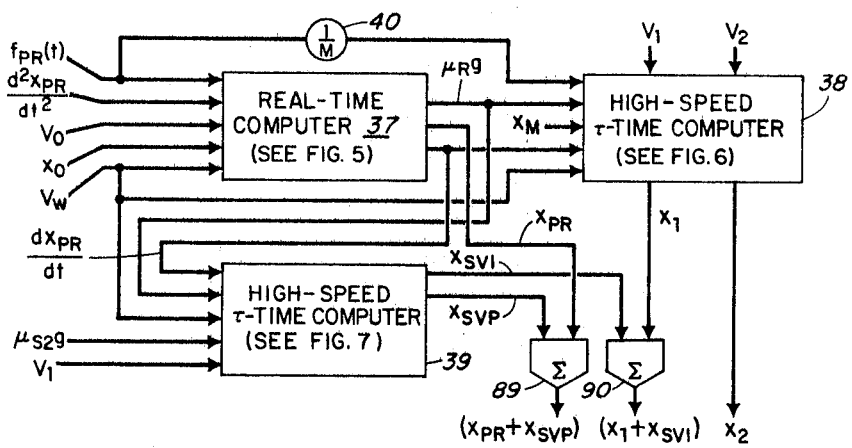
FIG. 4 shows a simplified block diagram of a real-time computer subsystem and the high-speed computer subsystems of the invention.

FIG. 4 shows a simplified block diagram of a portion of the overall computer system which is used to calculate the required distance and velocity qauntities both in real-time by real-time computer subsystem 37 and in high-speed time (hereinafter sometimes referred to as "$\tau$-time") by high-speed computer subsystems 38a and 39. Real-time computer 37 receives acceleration input information from the real-time computer subsystem shown in FIG. 3 as well as information concerning present engine thrust $f_{PR}(t)$, relative wind velocity $V_W$ and initial velocity and position quantities $V_0$ and $X_0$, respectively. From such input signals real-time computer 37 produces output signals representing the aircraft's present position $X_{PR}$ and present velocity $dX_{PR}/dt$ and a signal representing $\mu_R g$. Certain of such signals are appropriately fed to $\tau$-time computers 38 and 39 together with the engine thrust and relative wind velocity signals. Input signals representing ground-calculated velocities $V_1$ and $V_2$, a ground-calculated arbitrary distance $X_M$ for use in recycling the operation of $\tau$-time computer 38 as discussed in more detail below, and a signal $\mu_{S2}g$, representing an arbitrarily selected maximum value for the coefficient of braking friction $\mu_S$, are also supplied to $\tau$-time computers 38 and 39 as shown.

The $\tau$-time computer 38 is used to compute predicted values in $\tau$-time of the distance $X_1$ from the start of take-off to the aircraft's predicted position when it will have reached the commitment velocity $V_1$ and the distance $X_2$ from the start of the take-off to the aircraft's predicted position when it will have reached its take-off velocity $V_2$.

The $\tau$-time computer 39 is used to compute the predicted values in $\tau$-time of the distances $X_{SVP}$ and $X_{SV1}$, required for the aircraft to stop from its present velocity and from its commitment velocity, respectively. Such quantities are dependent on the value of the coefficient of braking friction $\mu_S$. When the value of $\mu_S$ exceeds the arbitrarily selected maximum value $\mu_{S2}$, $\tau$-time computer 39 is thereupon arranged to produce such quantities as a function of the fixed maximum value $\mu_{S2}$ of such coefficient as explained more fully below.

The above predicted quantities from $\tau$-time computers 38 and 39 together with the present distance quantity $X_{PR}$ produced by real-time computer 37 are in turn appropriately summed at summation amplifiers 89 and 90 to produce the three principal predicted distance quantities required for use in determining the aircraft's take-off performance. Such quantities, as discussed previously, include (1) the total distance $(X_{PR} + X_{SVP})$ required for the aircraft to reach its present velocity and to stop therefrom, (2) the predicted total distance $(X_1 + X_{SV1})$ required for the aircraft to reach its commitment velocity and to stop therefrom, each of such distance quantities being ultimately compared with a distance quantity $(L_R - X_{SM})$ representing the total runway distance less the safety-margin distance as discussed with reference to FIG. 9, and (3) the predicted distance $X_2$ required for the aircraft to reach its take-off velocity which distance quantity is compared with the distance quantity $(L_R - X_C)$ representing the total runway distance less the minimum distance required for climb-out under single-engine loss conditions as also discussed above with reference to FIG. 9. The above comparisons are made to determine whether take-off should proceed or whether take-off should be aborted in accordance with the following set of conditions.

Conditions for Continuing Take-Off

Condition #1

$$\left. \begin{array}{l} X_1 + X_{SVI} \leq (L_R - X_{SM}) \\ X_{PR} + X_{SVP} \leq (L_R - X_{SM}) \\ X_2 \leq (L_R - X_C) \end{array} \right\} \text{When } \frac{dX_{PR}}{dt} \leq V_1$$

Condition #2

$$X_2 \leq (L_R - X_C) \text{ When } \frac{dX_{PR}}{dt} > V_1$$

Conditions for Aborting Take-Off

Condition #3 (Normal Abort)

$$X_1 + X_{SVI} > (L_R - X_{SM}) \text{ When } \frac{dX_{PR}}{dt} \leq V_1$$

Condition #4 (Normal Abort)

$$X_{PR} + X_{SVP} > (L_R - X_{SM}) \text{ When } \frac{dX_{PR}}{dt} \leq V_1$$

Condition #5 (Normal Abort)

$$X_2 > (L_R - X_C) \text{ When } \frac{dX_{PR}}{dt} \leq V_1$$

Condition #6 (Normal Abort)

$$\left. \begin{array}{l} X_{PR} + X_{SVP} \leq (L_R - X_{SM}) \\ X_2 > (L_R - X_C) \end{array} \right\} \text{When } \frac{dX_{PR}}{dt} > V_1$$

Condition #7 (Emergency "RED" Abort)

$$\left. \begin{array}{l} X_{PR} + X_{SVP} > (L_R - X_{SM}) \\ X_2 > (L_R - X_C) \end{array} \right\} \text{When } \frac{dX_{PR}}{dt} > V_1$$

Once such comparisons have been made, suitable readout or display devices can be actuated to convey such comparative information to the pilot, or other members of the flight crew, as described below with reference to FIG. 9. As discussed more fully with reference to FIG. 9, under Conditions (3) through (6) the pilot stops the aircraft by normal braking means while under Condition (7) an emergency or "Red" abort indicates a possible crash situation under which the pilot must take all possible steps (normal braking, reversing engines, etc.) to stop the aircraft immediately.

Before discussing the detailed operation of computers 37, 38 and 39 it is desirable to describe the operational equations which are mechanized therein.

The present engine thrust $f_{PR}(t)$ of an aircraft as a function of time can be defined by the following equation:

$$f_{PR}(t) = M \frac{d^2 X_{PR}}{dt^2} + \mu_R (W - L_A) + C_D S \left( \frac{\delta}{2} \right) \left( V_W + \frac{dX_{PR}}{dt} \right) \quad (7)$$

where the symbols are as defined above and the aircraft's forward velocity $dX_{PR}/dt$ has added thereto a correctional quantity due to the relative wind velocity $V_W$.

In addition, the lift of the aircraft can be expressed in the following manner:

$$L_A = C_L S \left( \frac{\delta}{2} \right) \left( V_W + \frac{dX_{PR}}{dt} \right)^2 \quad (8)$$

If Equation 8 is substituted into Equation 7 and the resulting expression is solved for the acceleration $$d^2 X_{PR}/dt^2$$

the following equation is obtained:

$$\frac{d^2 X_{PR}}{dt^2} = \frac{1}{M} f_{PR}(t) - \mu_R g - K_1 \left( V_W + \frac{dX_{PR}}{dt} \right)^2 \quad (9)$$

where $K_1$ is equal to $$\frac{1}{M} \frac{\delta}{2} (S)(C_D - \mu_R' C_L)$$

and $\mu_R'$ is selected for simplicity as a fixed ground calculated quantity as opposed to the quantity $\mu_R$ which henceforth is used to designate a time variable quantity.

Under conditions where the engine thrust $f_{PR}(t)$ is reduced to zero, i.e., under aircraft braking, or stopping, conditions, the following equation, similar to Equation 9 with $\mu_S$ substituted for $\mu_R$ and $f_{PR}(t)$ eliminated, can be written:

$$\frac{d^2 X_S}{dt^2} = - \left[ \mu_S g + K_2 \left( V_W + \frac{dX_S}{dt} \right)^2 \right] \quad (10)$$

where $K_2$ is equal $$\frac{1}{M} (S) \frac{\delta}{2} (C_D - \mu_S' C_L)$$

and, in a manner similar to that discussed above, $\mu_S'$ is a fixed quantity while $\mu_S$ designates a time variable quantity.

Under practical conditions the coefficients of rolling and braking friction, $\mu_R$ and $\mu_S$, respectively, are within reasonable limits essentially proportional to each other so that the following expression can be written:

$$\mu_S = K_3 \mu_R \quad (11)$$

where $K_3$ is a constant of proportionality. Equation 11 remains valid so long as $\mu_S$ remains within upper and lower limits $\mu_{S2}$ and $\mu_{S1}$, respectively.

Figure 5:
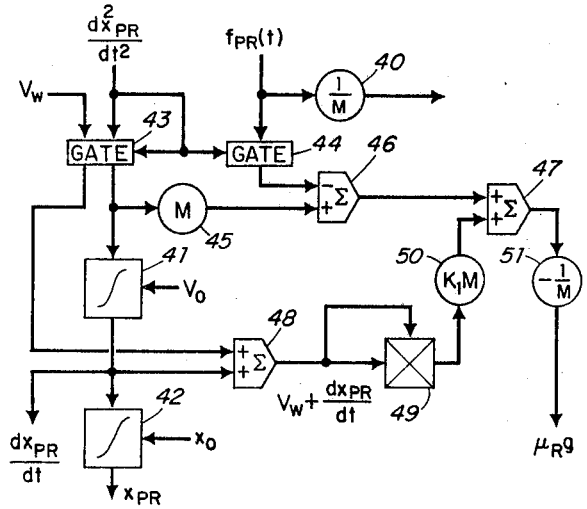
FIG. 5 shows a more detailed block diagram of the real-time computer subsystem shown in FIG. 4.

With reference to FIG. 5, the real-time computer subsystem 37 shown therein is utilized to provide signals representing the aircraft's present position $X_{PR}$, its present velocity $dX_{PR}/dt$ and the quantity $\mu_{Rg}$ as previously discussed. Such real-time quantities are then available for application to the $\tau$-time, high-speed computer subsystems 38 and 39, the operations of which are discussed below with reference to FIGS. 6 and 7.

In FIG. 5 the required output quantities are all derived from a real-time measurement of the present forward acceleration $d^2 X_{PR}/dt^2$ of the aircraft as computed by the accelerometer subsystem shown and discussed with reference to FIG. 3. Thus, in FIG. 5 an input signal representing present aircraft forward acceleration is supplied to a first integrator 41, the output of which is fed to a second integrator 42. Input acceleration $d^2 X_{PR}/dt^2$ is supplied to integrator 41 through a gating circuit 43 which operates so as to produce a real-time computation only after the input acceleration exceeds a particular preselected value. Thus, the acceleration $d^2 X_{PR}/dt^2$ is simultaneously fed to gate 43 as a gate actuation control signal as shown. Such signal is also fed to a second gating circuit 44 so that the engine thrust $f_{PR}(t)$ feeds through gate 44 for use in the real-time computation system only after the input acceleration exceeds the above-discussed preselected value. The quantity $f_{PR}(t)$ may be ground calculated as a fixed quantity and fed to computer 37 as a constant value, or it may be derived as a presently measured quantity directly from suitable engine instrumentation.

Once gates 43 and 44 are actuated to become conductive, the input acceleration is integrated by integrator 41 which produces an output signal $dX_{PR}/dt$ representing the present velocity of the aircraft. Such velocity quantity is then fed to integrator 42, the output of which represents the present position $X_{PR}$ of the aircraft on the runway. To assure that the present velocity and present position values conform to the actual initial take-off conditions, the initial velocity $V_0$ of the aircraft is fed as an initial condition to integrator 41 and the initial position $X_0$ of the aircraft on the runway is fed as an initial condition to integrator 42. If the aircraft is making its take-off from a stand-still position, the initial velocity $V_0$ is equal to zero, while if the aircraft is making a running take-off, $V_0$ will, of course, have a specific initial value. $X_0$ and $V_0$ are illustrated diagrammatically in the runway diagram of FIG. 1.

The aircraft forward acceleration is also fed simultaneously to a coefficient amplifier 45 where it is multiplied by the quantity M. The output of coefficient amplifier 45 is fed to one input of a summation amplifier 46, the other input of which is supplied with the engine thrust signal $f_{PR}(t)$ which is fed thereto via gate 44. The output of summation amplifier 46 is fed to one input terminal of a second summation amplifier 47.

Simultaneously the present aircraft velocity $dX_{PR}/dt$ is fed to a first input terminal of a summation amplifier 48, the other input of which is supplied with a signal representing the relative wind velocity $V_W$ which is fed thereto via gate 43 so that the velocity measurement as used in Equation 8 is thereby suitably corrected for relative wind velocity. The output of summation amplifier 48 is then fed to the inputs of a multiplier circuit 49 so that the output signal from such multiplier is the square of the input signal thereto. Thus, the quantity $$\left(V_W + \frac{dX_{PR}}{dt}\right)^2$$

is obtained and supplied to the input of a coefficient amplifier 50 which multiplies such expression by the quantity $K_1M$. The output of coefficient amplifier 50 is then fed to a second input terminal of summation amplifier 47, the output of which is then multiplied by the quantity $(-1/M)$ at coefficient amplifier 51. The output of coefficient amplifier 51 then represents the quantity $(\mu_R g)$ in accordance with the relationship designated by Equation 9.

Thus, real-time computer 37 as shown in detail in FIG. 5 provides the quantities $\mu_R g$, $dX_{PR}/dt$ and $X_{PR}$, all of which represent the varying values of such quantities as measured in real-time. Such quantities, together with the signal representing $(1/M f_{PR}(t))$, as obtained at the output of coefficient amplifier 40, are then fed to the $\tau$-time, high-speed computers 38 and 39 as discussed with reference to FIG. 4 and as shown in more detail in FIGS. 6 and 7.

Figure 6:
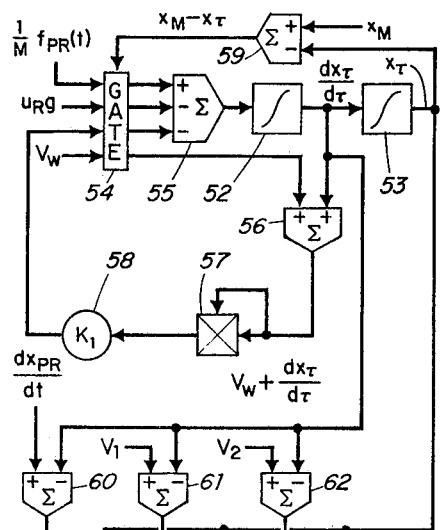
FIG. 6 shows a more detailed block diagram of one of the high-speed computer subsystems of FIG. 4.

In FIG. 6 the input quantities $(1/M)f_{PS}(t)$ and $(\mu_R g)$ are fed to $\tau$-time high-speed computer 38 via a gating circuit 54. That portion of computer 38 comprising integrators 52 and 53, summation amplifiers 55 and 56, multiplier 57 and coefficient amplifier 58 represents a mechanization in $\tau$-time of an equation of the form of Equation 9 and produces output signals $dX_\tau/d\tau$ and $X_\tau$ which can be appropriately used in the remaining portion of computer 38 to provide output signals $X_1$ and $X_2$ which represent the predicted distances, computed at high-speed in $\tau$-time, from the starting end line 20 of the runway to the position the aircraft will have when it reaches the commitment velocity $V_1$ and to the position the aircraft will have when it reaches its take-off velocity $V_2$, respectively. Such predicted quantities are derived from the real-time quantities representing engine thrust, present velocity, ground calculated velocities $V_1$ and $V_2$, and the variable quantity $\mu_R g$.

The input signals $(1/M)f_{PR}(t)$, $\mu_R g$ and a feedback signal related to the velocity quantity $dx_\tau/dt$ are fed to a summation amplifier 55 and, thence to integrator 52 which produces the integrated signal $dX_\tau/d\tau$ which represents a $\tau$-time computed velocity, the significance of which is discussed below. That signal is in turn integrated by integrator 53 to produce an output signal $X_\tau$, which represents a $\tau$-time computer distance, the significance of which is also discussed below. The computed velocity $dx_\tau/d\tau$ is added to the relative wind velocity $V_W$ in summation circuit 56, the output of which is fed to the input terminals of a multiplier circuit 57 to produce a signal equal to $$\left(V_W + \frac{dX_\tau}{d\tau}\right)^2$$

This quantity is multiplied by $K_1$ at coefficient amplifier 58 and is in turn applied to summation amplifier 55 via gate 54 as a feed back signal.

Gating circuit 54 becomes conductive when its input control signal from summation amplifier 59 is positive so that $\tau$-time computer 38 is operative only when the output signal $X_\tau$ from integrator 53 is less than an arbitrarily selected maximum value $X_M$, which quantities are continuously compared at summation amplifier 59 to provide the gating control signal for gate 54. When the integrated signal $X_\tau$ becomes equal to and subsequently greater than $X_M$, the output from summation amplifier 59 passes through zero and becomes negative and gating circut 54 becomes non-conductive at which point the integrators recycle to begin the $\tau$-time computation again. By suitable control of gate 54 the operation of $\tau$-time computer 38 can be recycled to provide predicted velocity and distance quantities periodically. The recycling time can be controlled by the selection of the value of $X_M$ so that the greater the value of $X_M$ the longer the cycling time. For practical operation, $X_M$ and computer parameters may be appropriately chosen, for example, so that the $\tau$-time computer 38 is recycled approximately once every second in one particular embodiment.

The $\tau$-time computer 38 of FIG. 6, therefore, produces two signals $dX_\tau/d\tau$ and $X_\tau$ at the outputs of integrators 52 and 53, respectively, which signals represent predicted $\tau$-time computed velocity and distance quantities.

The computed velocity signal $dX_\tau/d\tau$ is fed to one input of each of three summation amplifiers 60, 61 and 62. The aircraft's present velocity $dX_{PR}/dt$, as computed in real-time, is fed to a second input of summation amplifier 60. The ground calculated commitment velocity $V_1$ is fed to a second input of summation amplifier 61, while the ground calculated take-off velocity $V_2$ is fed to a second input of summation amplifier 62. The outputs of summation amplifiers 60, 61 and 62 provide signals for controlling the operation of gating circuits 63, 64 and 65, respectively.

The $\tau$-time computed position signal $X_\tau$ is fed to the inputs of each of said gates 63, 64 and 65. So long as the $\tau$-time computed velocity $dX_\tau/d\tau$ is less than to the real-time computed present aircraft velocity $dX_{PR}/dt$, gate 63 is actuated so as to become conductive but value-holder circuit 66 produces no output signal, as described more clearly below with reference to FIGS. 8A and 8B. When $dX_\tau/d\tau$ becomes greater than the real-time computed present velocity, a signal $X_{P\tau}$ is produced at the output of value holder circuit 66 which value is maintained for use in summation amplifier 88 as shown.

When the $\tau$-time computed velocity $dX_\tau/d\tau$ becomes greater than the ground calculated commitment velocity $V_1$, value holder circuit 67 similarly produces a signal representing the $\tau$-time predicted computed distance $X_{1\tau}$. The value of such output signal is maintained at the output of value-holder circuit 67 for use in summation amplifiers 88 and 91 as shown.

When the $\tau$-time computed velocity $dX_\tau/d\tau$ becomes greater than the ground calculated take-off velocity $V_2$, value-holder circuit 68 similarly produces a signal representing the $\tau$-time predicted computed distance $X_{2\tau}$. The value of such output signal is maintained at the output of value-holder circuit 68 for use in summation amplifier 91 as shown.

The operations of gates 63, 64, 65, and value-holder circuits 66, 67 and 68 are controlled by the output signals from summation amplifiers 60, 61 and 62, respectively, as representatively described in more detail later with reference to FIGS. 8A and 8B.

The quantities $X_{PR}$, $X_{P\tau}$ and $X_{1\tau}$ are supplied to the input terminals of summation amplifier 88. The output of summation amplifier 88 then represents the predicted, $\tau$-time computed quantity $X_1$ which is then added to the predicted, $\tau$-time computed quantity $X_{SV1}$ at summation amplifier 90 (as shown in FIGS. 4 and 9) to produce the quantity $(X_1+X_{SV1})$ which represents the total predicted $\tau$-time computed distance required for the aircraft to reach the velocity $V_1$ plus the distance required to stop from such velocity. This output signal is one of the three principal distance quantities needed to provide appropriate pilot information for use in accordance with Conditions (1) through (7) as discussed above.

Figure 9:
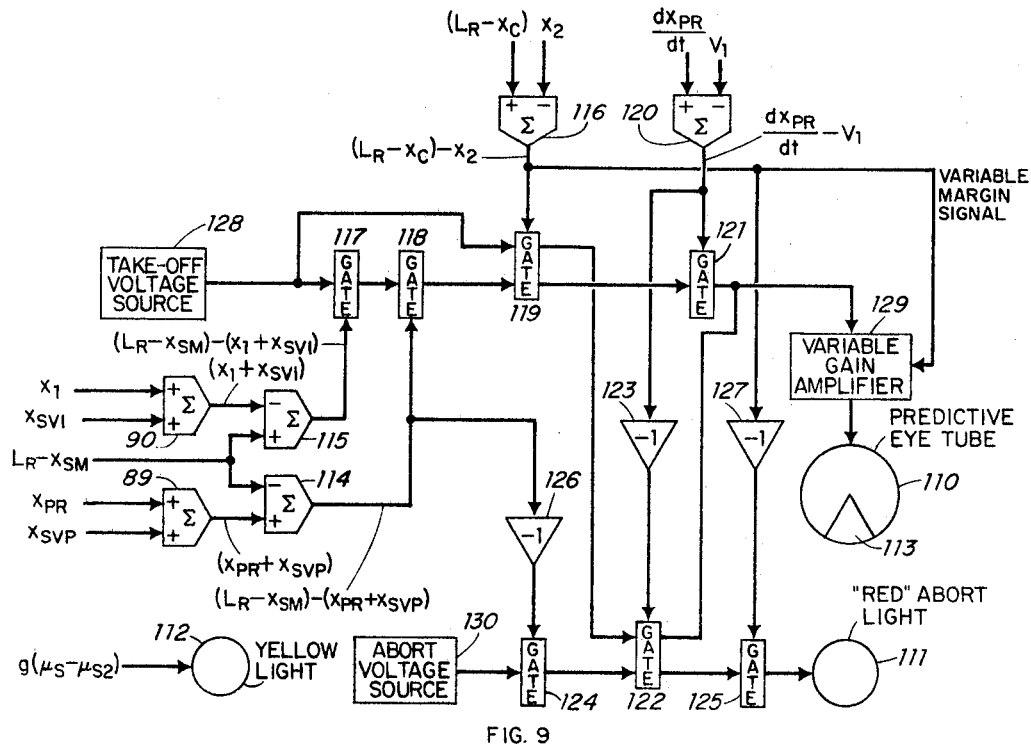
FIG. 9 shows a block diagram of a portion of the overall system which utilizes output signals from the above computer subsystems to provide appropriate control signals for operating visual panel indication devices.

Further, the real-time computed quantity $X_{PR}$ is added to the predicted, $\tau$-time computed quantity $X_{SVP}$ at summation amplifier 89 (as shown in FIGS. 4 and 9) to produce the quantity $(X_{PR}+X_{SVP})$ which represents the total predicted, $\tau$-time computed distance required for the aircraft to reach its present velocity plus the distance required to stop from such velocity. This output signal is another of the three principal quantities needed to provide appropriate pilot information for use in accordance with Conditions (1) through (7).

Further, the predicted, $\tau$-time computed quantity $X_{1\tau}$ is subtracted from the predicted, $\tau$-time computed quantity $X_{2\tau}$ at summation amplifier 91. The output of summation amplifier 91 is fed to a coefficient amplifier 92 which multiplies such output by $n/n-1$, where $n$ is the total number of engines in the aircraft. For example, for a four-engine aircraft, the multiplier of coefficient amplifier 92 is equal to 4/3, which operation converts the output signal from four-engine operation to three-engine operation so that an adjustment for the difference in acceleration due to a single engine loss is provided. The output of coefficient amplifier 92 is then compared to the predicted, $_\tau$-time computed quantity $X_1$ at summation amplifier 93 to produce an output quantity representing the predicted, $\tau$-time computed distance $X_2$ required to reach the take-off velocity $V_2$. Such output signal is another of the three principal quantities needed to provide appropriate pilot information for use in accordance with Conditions (1) through (7).

Figure 7:
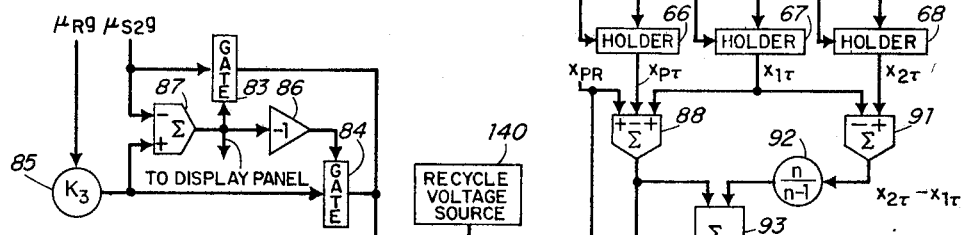
FIG. 7 shows a more detailed block diagram of another of the high speed computer subsystems of FIG. 4.
Figure 7:
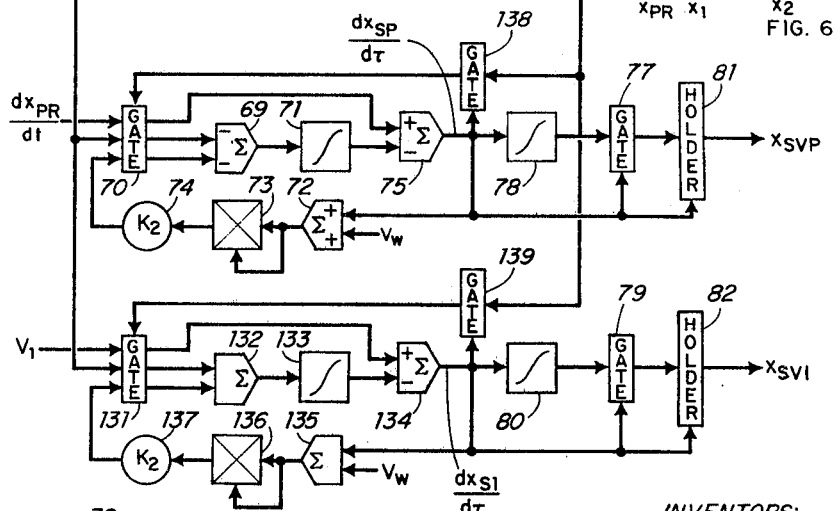

The $\tau$-time, high-speed computer subsystem 39 of FIG. 4 is shown in more detail in FIG. 7 and implements in $\tau$-time the braking conditions of Equation 10. The purpose of computer subsystem 39 is to produce in $\tau$-time those quantities which represent the predicted distances, $X_{SVP}$ and $X_{SV1}$, required for the aircraft to stop from its present velocity $dX_{PR}/dt$ and from its commitment velocity $V_1$, respectively. Such quantities are then used as input signals to summation amplifiers 89 and 90, the operation of which is described in FIGS. 4 and 9.

In FIG. 7 the stopping distances $X_{SVP}$ and $X_{SV1}$ are each obtained by similar computational processes and, as mentioned with reference to FIG. 4, computer 39 requires input signals $\mu_R g$ and $dX_{PR}/dt$ obtained as real-time computed quantities from the operation of real-time computer 37 and input signal $\mu_{S2}g$, $V_1$ $V_W$ and $K_2$ obtained as fixed ground calculated quantities. The quantity $\mu_R g$ is multiplied by a suitable proportionality constant $K_3$ in accordance with Equation 11 to provide the quantity $\mu_S g$, where $\mu_s$ is the coefficient of braking friction.

With respect to the computation of $X_{SVP}$, the quantity $\mu_s g$ is applied to a gating circuit 70 via another gating circuit 84, the purpose and operation of which is described more fully below. The quantity $$K_2\left(V_W+\frac{dX_{SP}}{d\tau}\right)^2$$

related to the computed velocity $dX_{SP}/d\tau$ which has been suitably corrected for wind velocity $V_W$, is also fed to gating circuit 70 after which it is combined with $\mu_s g$ in summation amplifier 69. The output of summation amplifier 69 represents a computed acceleration quantity under braking conditions (more properly described as a deceleration) which is integrated in integrator 71 to obtain a $\tau$-time computed velocity quantity. This velocity is thereupon subtracted from the real-time computed present velocity $dX_{PR}/dt$ at summation amplifier 75, $dX_{PR}/dt$ being fed to amplifier 75 via gating circuit 70. The output of summation amplifier 75 thereupon represents a computed velocity under braking conditions identified for convenience as $dX_{SP}/d\tau$. This velocity is added to the relative wind velocity $V_W$ in summation amplifier 72, the output of which is fed to both input terminals of a multiplier circuit 73 to provide a quantity $$\left(V_W+\frac{dX_{SP}}{d\tau}\right)^2$$

The latter quantity is multiplied by $K_2$ at coefficient amplifier 74 to produce the appropriate feedback signal mentioned above for summation amplifier 69 via gating circuit 70. The recycling operation of gate 70 is controlled in a suitable manner discussed in more detail below.

The output $dX_{SP}/d\tau$ of summation amplifier 75 which represents a computed velocity quantity related to the present velocity of the aircraft under braking conditions is then fed to the input of an integrator circuit 78 to produce a $\tau$-time computed distance quantity under braking conditions which is then fed to a value-holder circuit 81 via a gating circuit 77. When the $\tau$-time computed velocity signal from integrator 71 becomes greater than the aircraft real-time computed present velocity (i.e., the output of summation amplifier 75 becomes negative), value-holder circuit 81 produces an output signal which represents the predicted $\tau$-time computed value of the distance $X_{SVP}$ required for the aircraft to stop from its present velocity. The value of such output signal is maintained at such value at the output of value holder 81 for use in summation amplifier 89 as shown in FIGS. 4 and 9.

In a similar manner, in order to compute the quantity $X_{SV1}$ the quantity $\mu_s g$ is fed to a gating circuit 131 whereupon it is combined in summation amplifier 132 with the quantity $$K_2\left(V_W+\frac{dX_{S1}}{d\tau}\right)^2$$

related to the computed velocity $dX_{S1}/d\tau$ which has been suitably corrected for wind velocity $V_W$, which is also fed to summation amplifier 132 via gating circuit 131. The output of summation amplifier 132 represents a computed deceleration quantity which is then integrated in integrator 133, the output of which represents a $\tau$-time computed velocity quantity under braking conditions. This velocity quantity is subtracted from the ground calculated commitment velocity $V_1$ at summation 134, $V_1$ also being fed to the input of summation amplifier 134 via gating circuit 131. The output of summation amplifier 134 thereupon represents a computed velocity quantity under braking conditions identified for convenience as $dX_{S1}/d\tau$. This velocity is added to the relative wind velocity $V_W$ in summation amplifier 135, the output of which is fed to both input terminals of a multiplier circuit 136 to provide the quantity $$\left(V_W+\frac{dX_{S1}}{d\tau}\right)^2$$

The latter quantity is appropriately multiplied by $K_2$ at coefficient amplifier 137 to produce the appropriate feedback signal mentioned above for summation amplifier 132 via gating circuit 131.

The output $dX_{S1}/d\tau$ of summation amplifier 134 is also fed to an integrator 80 to produce a $\tau$-time computed distance quantity under braking conditions which is then fed to a value holder circuit 82 via a gating circuit 79. When the $\tau$-time computer velocity signal from integrator 133 becomes greater than the commitment velocity $V_1$ (i.e., the output of summation amplifier 134 becomes negative), value holder circuit 82 produces an output signal which represents the predicted $\tau$-time computed value of the distance $X_{SV1}$ required for the aircraft to stop from its commitment velocity. The value of such output signal is maintained at such value at the output of the value holder circuit 82 for use in summation amplifier 90 as shown in FIGS. 4 and 9.

A signal representing ($\mu_S g$) is derived from the real-time computation of ($\mu_R g$) by the multiplication thereof by proportionality constant $K_3$ at coefficient amplifier 85. As discussed above, it is necessary to place an upper limit on the value of $\mu_S$. For this purpose ($\mu_S g$) is compared with an arbitrarily selected upper limit ($\mu_{S2} g$) at summation cicruit 87. The output of summation circuit 87 is then used to control the actuation of gates 83 and 84, the latter being controlled by the negative of the value of the signal from circuit 87 as obtained via polarity reversal amplifier 86. As long as ($\mu_S g$) is less than ($\mu_{S2} g$), the quantities $X_{SVP}$ and $X_{SV1}$ are computed by utilizing ($\mu_S g$) as transmitted to gates 70 and 131 via gate 84. Whenever ($\mu_S g$) reaches or exceeds its upper limit ($\mu_{S2} g$), (i.e., the output of summation amplifier 87 goes from a negative to a positive value), gate 83 becomes conductive and gate 84 becomes non-conductive so that the constant quantity ($\mu_{S2} g$) is transmitted to gates 70 and 131 via gate 83 for such computation purposes.

The operation of $\tau$-time computer 39 is recycled at appropriate times. In the computer subsystem as shown in FIG. 7 this recycling operation is controlled by the value of the computed velocity quantities $dX_{SP}/d\tau$ and $dX_{S1}/d\tau$ as obtained from the outputs of summation amplifiers 75 and 134, respectively. The output of summation amplifier 75 controls the operation of gating circuit 138, the output of which in turn controls the operation of gating circuit 70. Gate 138 is non-conducting so long as the $\tau$-time computed velocity quantity from integrator 71 is less than the real-time computed present velocity of the aircraft $dX_{PR}/dt$.

Similarly, the output of summation amplifier 134 controls the operation of a gating circuit 139, the output of which in turn controls the operation of gate 131. Gate 139 is non-conductive so long as the computed velocity quantity from integrator 133 is less than the commitment velocity $V_1$. The input signals to gates 138 and 139 are obtained from an appropriate recycle voltage source 140.

Thus, $\tau$-time computer 39 is recycled (i.e., gates 70 and 131 are made conductive) only when the computed velocity quantities from integrators 71 and 133 become greater than the real-time computed aircraft velocity $dX_{PR}/dt$ and the ground calculated commitment velocity $V_1$, respectively, at which times gates 138 and 139 both become conductive and the recycle voltage is applied to gates 70 and 131. Such operation assures that the computer is not recycled until computation of the appropriate distance quantities $X_{SVP}$ and $X_{SV1}$ is completed.

Both $\tau$-time computers 38 and 39 utilize unique value holder circuits, such as circuits 66, 67 and 68 in $\tau$-time computer 38 and circuits 81 and 82 in $\tau$-time computer 39. The operation of such circuits can be explained with the help of the diagrammatic and graphical representations shown in FIGS. 8A and 8B, respectively which depict the operation of a typical value holder circuit 100 of the type used in such subsystems. The circuit of FIG. 8A shows an input signal A obtained from the output of a gate 101, an output signal B, and a control signal C used for controlling the operation of gate 101 and a gate 102 which is a part of value holder circuit 100. In FIG. 7, for example, value holder circuit 82 has a corresponding input signal obtained from gate 79, an output signal $X_{SV1}$ and a control signal $$\left(V_1 - \frac{dX_{S1}}{d\tau}\right)$$

from summation amplifier 134 for controlling the operation of gate 79 and a gate (not shown) within value holder circuit 82.

Figure 8A:
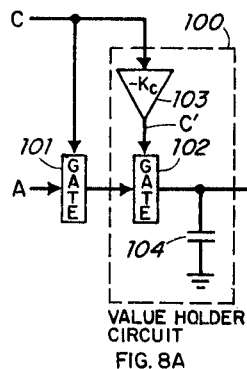
FIG. 8 shows a partial schematic and partial block diagram of a typical value holder circuit as used in the high-speed computer subsystems of FIGS. 6 and 7.

In the representative circuit of FIG. 8A, output signal B is not available until gate 102 is placed in a conductive state by control signal C which is fed to gate 102 through a polarity reversal amplifier 103 having a gain indicated by $-K_c$ which amplifies and changes the polarity of control signal C to produce control signal C'. When such control signal causes gate 102 to become conductive, the voltage value of input signal A is applied via gate 102 to a condenser 104 which thereupon charges up to the value of signal A. When gate 101 is subsequently made non-conductive, signal A is no longer applied to condenser 104 but output signal B is retained at the value of signal A to which such condenser has been charged for a period of time dependent on the time constant of the condenser circuit (i.e., the time at which such signal decays to a specified percentage of its initially charged value). Such time constant may be arranged to be relatively long in comparison to the recycling time of the computer subsystem so that the output of the value holder is maintained at the condenser-charged value which it achieved after actuation of its control gate.

Figure 8B:
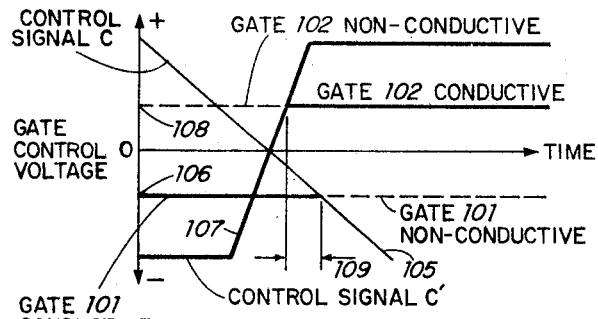

FIG. 8B shows a graphical represenation of the relative operations of gates 101 and 102 where it is assumed that such gates will be in a conductive state when the control signal to the gate is essentially positive and in a nonconductive state when the control signal is essentially negative. Thus, as shown in FIG. 8B, when control signal C, designated by line 105, is positive, gate 101 is conductive. As control signal C passes through zero and becomes negative, gate 101 remains conductive only until such signal becomes sufficiently negative, as at the value designated by point 106, to cause gate 101 to become non-conductive. Thereafter, so long as control signal C becomes more negative, gate 101 remains in a nonconductive state.

Line 107 designates the control signal applied to gate 102 and represents the negative of control signal C, which has been suitably reversed in polarity and amplified by amplifier 103. For purposes of discussion, such control signal has been designated as control signal C' in FIGS. 8A and 8B. So long as control signal C' is negative, gate 102 is nonconductive. Gate 102 only becomes conductive when control signal C' passes through zero and reaches a sufficiently positive value, such as the value shown at point 108, to cause conduction. Gate 102 thereafter remains conductive so long as control signal C' continues to become more positive. Thus, there is a period of time, designated by the time span 109 in FIG. 8B, during which both gate 101 and gate 102 are simultaneously conductive. The duration of this time period is determined by the slope of line 107 which can be controlled by the gain ($-K_c$) of amplifier 103.

Thus, when gate 101 is conductive the output signal A is applied to capacitor 104 as soon as gate 102 also becomes conductive. Capacitor 104 thereupon charges up to the value of signal A and is retained at such value even when such voltage is removed at the time gate 101 becomes nonconductive.

Thus, in FIG. 7, for example, the control signal from summation amplifier 76 is applied to the value holder gate (i.e., the gate, not shown, of value holder circuit 82 equivalent to gate 102 of FIG. 8A) only after a suitable polarity reversal by an appropriate amplifier (also not shown but equivalent to amplifier 103 of FIG. 8A). Thus, the value holder gate is controlled by a signal which is the negative (suitably amplified) of the control signal for gate 79. So long as the computed velocity $dX_{S1}/d\tau$ is less than $V_1$, gate 79 is conductive while the value-holder gate is nonconductive. At some time after $$\left(V_1 - \frac{dX_S}{d\tau}\right)$$

goes through zero, gate 79 becomes nonconductive while the gate of value holder circuit 82 becomes conductive. In a manner similar to that described with reference to FIGS. 8A and 8B, for a brief duration of time both gate 79 and the value holder gate are simultaneously conductive and the condenser of value holder circuit 82 charges to the value of the signal from integrator 80 (via gate 79) after which time the gate 79 becomes nonconductive. The period of time during which both gates are conductive is primarily determined by the gain of the polarity reversal amplifier of value holder circuit 82. Other value holder circuits of FIGS. 6 and 7 operate in a similar manner.

Thus, by the use of the acceleration measurement subsystem of FIG. 3, the real-time computer subsystem 37 of FIG. 5, the $\tau$-time high speed computer subsystems 38 and 39 of FIGS. 6 and 7, respectively, and the summation amplifiers 89 and 90, the distance quantities shown on the left-hand sides of the above listed take-off Conditions (1) through (7) are obtained for comparison with the known, ground-calculated quantities shown on the right-hand sides of such conditions in order to provide the necessary information for determining whether take-off should be continued or aborted. FIG. 9 illustrates how such information can be utilized for visual display to the pilot or to other members of the flight crew.

As shown in FIG. 9, the pilot is given two principal visual indications of the performance conditions of the aircraft via the panel devices 110 and 111. Panel device 110 represents a well-known electron-ray tube, or so-called "electric eye" or "tuning eye" indicator tube, designated as "predictive eye tube" 110 in FIG. 9. In such a tube a fluorescent pattern 113 is caused to open or close in response to an input signal so that a fan-like pattern of varying size occurs on the face of the tube. As described in more detail below, predictive eye tube 110 operates to cause the fluorescent fan pattern 113 to remain open so long as conditions permitting take-off are maintained. The size of the fluorescent pattern opening provides at a glance an indication of the safety margin on which the aircraft is operating. For example, if the pattern is open to a relatively large extent and occupies a good portion of the area of the face of the tube, the pilot knows that he is operating well within the predicted take-off conditions and has a substantial margin of safety for take off. As the pattern (the eye) begins to close and, thus, to occupy less and less of the area of the face of the tube, the pilot knows that he is approaching marginal predicted conditions which indicate that a necessity to abort may occur.

As the fluorescent fan pattern 113 is colored green, a "go" condition is indicated for a predicted successful take-off. As soon as the eye closes (i.e., the area of the fluorescent pattern 113 is reduced to zero), the face of the tube is caused to glow with an appropriate red color so that the tube then indicates to the pilot that a normal abort condition [in accordance with Conditions (3) through (6) discussed above] exists and he must take the normal precautions to abort the take-off. Control of the operation of predictive eye tube 110 is discussed more fully below.

The second panel indication provided for the pilot is a "RED" abort panel light 111. Light 111 is normally in a darkened, or off, condition so long as one of Conditions (1) through (6) exists and either a take-off situation or a normal abort situation is indicated. Panel light 111 is only used when an emergency situation arises which requires the pilot to take all possible steps to stop the aircraft immediately. Such circumstances exist under Condition (7) where the distance available for taking off or for stopping is indicated as being too short to achieve either a safe take-off or a safe stop, using the normal precautions, once the commitment velocity has been reached. The pilot is thus warned of possible imminent crash conditions by the actuation of "RED" abort light 111 as discussed more fully below.

As shown in FIG. 9, the signals $(X_{PR}+X_{SVP})$ and $(X_1+X_{SV1})$ are obtained at the outputs of summation amplifiers 89 and 90, respectively, and the signal $X_2$ is obtained from $\tau$-time computer 38. Such signals are applied as shown to one input of summation amplifiers 114, 115 and 116, respectively. The ground calculated quantity $(L_R-X_{SM})$ is fed to the second input terminals of summation amplifiers 114 and 115, while the ground calculated quantity $(L_R-X_C)$ is fed to a second input terminal of summation amplifier 116.

The signal from summation amplifier 115 controls the operation of a gating circuit 117, the signal from summation amplifier 114 controls the operation of a gating circuit 118 and the signal from summation amplifier 116 controls the operation of a gating circuit 119. Signals representing the real-time computed aircraft velocity $dX_{PR}/dt$ and a ground calculated commitment velocity $V_1$ are fed to the inputs of a summation amplifier 120 to produce an output signal $$\left(\frac{dX_{PR}}{dt}-V_1\right)$$

which is used to control the operation of a gate 121. The negative of the output signal from summation amplifier 120 is used to control a gating circuit 122 via polarity reversal amplifier 123. Similarly the negative of the output signals from summation amplifiers 114 and 116 are used to control the operation of gates 124 and 125, respectively, via polarity reversal amplifiers 126 and 127, respectively.

An appropriate voltage from a voltage source, designated as "Take-Off" voltage source 128, is applied to the input of variable gain amplifier 129 via a first path through gates 117, 118, 119 and 121 and via second path through gates 119 and 122. The gain of the variable gain amplifier 129 is controlled in accordance with the value of the output signal, designated as the "Variable Margin Signal," from summation amplifier 116. An appropriate voltage from a voltage source, designated as "Abort" voltage source 130, is applied to "RED" abort light 111 via a path through gates 124, 122 and 125.

The display system shown in FIG. 9 operates in accordance with Conditions (1) through (7) as described in more detail below.

In accordance with Condition (1), gates 117, 118, 119 and 121 are all actuated to become simultaneously conductive so that an appropriate voltage from take-off voltage source 128 is applied to variable gain amplifier 129 to operate predictive eye tube 110. The area of fluorescent pattern 113 is determined by the gain of amplifier 129 which is in turn controlled by the output of summation amplifier 116, as discussed above. Thus, when the quantity $(L_R-X_C)$ is greater than $X_2$ (i.e., the take-off distance available exceeds the predicted take-off distance required by the aircraft), fluorescent pattern 113 is open. The extent to which it opens depends upon how much the available take-off distance exceeds the predicted take-off distance that is required so that if such difference is large (e.g., there is a relatively large amount of runway distance available for a safe take-off), the eye pattern is open to a relatively large extent. As explained above, the relation between the take-off distance available and the predicted take-off distance required is indicated to the pilot at a glance by the size of the area of fluorescent pattern 113. Under Condition (1) it should be noted that gates 122, 124 and 125 are non-conducting.

In accordance with Condition (2), gates 119 and 122 are actuated to become simultaneously conductive while gate 121 is nonconductive. Under such condition a take-off voltage signal from voltage source 128 is fed to the input of variable gain amplifier 129 via gates 119 and 122 to actuate predictive eye tube 110 to indicate to the pilot that the predicted conditions are such that take-off may proceed. Operation under Condition (2) does not depend on the operation of either gates 117 or 118 and the values of the control signals thereto have no particular relevance under such condition.

Under Condition (3) gates 117 and 122 are nonconductive so that no signal is applied to variable gain amplifier 128 and the area of fluorescent pattern 113 of predictive eye tube 110 is reduced to zero (i.e., the eye is closed). At that time tube 110 is arranged to glow with a red color to indicate immediately to the pilot that he must take the normal steps to abort the take-off.

In a similar manner under Conditions (4) and (5), at least gates 118 or 119, respectively, are nonconductive, together with gate 122, so that no voltage is applied to variable gain amplifier 129 and the area of fluorescent pattern 113 is closed and predictive eye tube glows red to indicate a condition for normal abortion of the take-off.

Under Condition (6), gate 119 is nonconductive so that no voltage is applied to variable gain amplifier 129 and a normal abort indication is again given by predictive eye tube 110. Under such condition, since gate 124 is also nonconductive no signal is applied to "RED" abort light 111 and that light remains in a darkened, or off, status.

Under Condition (7), gate 119 is nonconductive but gates 122, 124 and 125 are simultaneously actuated to become conductive so that a voltage from "Abort" voltage source 130 is applied to "RED" abort light 111 so that it is appropriately lighted. Under such condition both abort light 111 and predictive eye tube 110 glow red to indicate to the pilot that emergency action must be taken to stop the aircraft immediately. The pilot must then do all he can to avoid or to prepare for a crash (i.e., reverse engines, alert passengers and crew, etc.).

Thus, in accordance with the operation of the display subsystem of FIG. 9 the pilot is provided with an immediate indication as to the predicted conditions under which the aircraft is operating so that he can know not only whether he should continue his take-off or to abort it but also the general margin of safety under which his take-off is proceeding. Such a display system represents only one particular embodiment of a display for the pilot or other crew members and other display systems may be devised by those skilled in the art to accept the input information from the appropriate computer subsystems to provide the pilot with an indication as to whether he should continue his take-off or discontinue it.

A further refinement in the display system of FIG. 9 may also be used with reference to a caution or yellow panel light 112 shown therein. As mentioned above with reference to FIG. 7, it is often desirable to indicate when the braking coefficient of friction $\mu_s$ exceeds an arbitrarily selected maximum value $\mu_{S2}$. Such a condition is indicated by the yellow panel light 112 which is actuated by the signal $g(\mu_S - \mu_{S2})$ from the output of summation amplifier 87 in FIG. 7. So long as $\mu_S$ is less than $\mu_{S2}$, such signal is negative and yellow caution light 112 is in a darkened or "off" condition. As soon as $\mu_S$ exceeds $\mu_{S2}$, the input control signal to yellow light 112 becomes positive and the light is turned on to indicate such a condition to the pilot. From such indication the pilot is immediately made aware that his runway conditions or the conditions of the aircraft (brake dragging, improper tire inflation, etc.) are different than those assumed prior to start of the take-off run. If, for example, predictive eye tube 110 shows minimal marginal operation, the actuation of yellow panel light 112 and the observation of external weather conditions by the pilot will provide him with a better assessment of or "feel" for the reasons behind such minimal marginal performance. If the take-off is ultimately aborted, the existence and time of such an indication may provide a significant clue as to the cause of the aborted take-off.

Other modifications to the overall system of the invention may occur to those skilled in the art without departing from the spirit and scope of the invention. Hence, the invention is not to be misconstrued as limited to the particular embodiment as described herein except as defined by the appended claims.

What is claimed is:

1. An aircraft take-off monitoring system comprising means for comparing the predicted distance required for said aircraft to reach its present position and to stop from said position from its present velocity with the safe runway distance available for take-off; means for comparing the predicted distance required for said aircraft to reach a position where it will have attained a preselected commitment velocity and to stop from said position from said commitment velocity with said safe runway distance available for take-off;

means for comparing the predicted distance required for said aircraft to reach a position where it will have attained its take-off velocity with the total runway distance less the minimum distance required for said aircraft to take off with the loss of single engine and still clear a preselected height at the end of said runway; and means responsive to each of said comparing means for providing operating information to at least one member of the crew of said aircraft during the take-off run of said aircraft.

2. An aircraft take-off monitoring system comprising means for measuring the forward acceleration of an aircraft during its take-off run along a runway;

real-time computer means responsive to said acceleration measurement for computing the present velocity of said aircraft and the distance traveled by said aircraft to reach its present position on said runway;

high speed computer means responsive to said computed present velocity and distance for computing predicted values of a first quantity equal to the distance required for said aircraft to reach its present position plus the distance required to stop from said position from said present velocity, a second quantity equal to the distance required for said aircraft to reach a position where it will have attained a preselected commitment velocity plus the distance required to stop from said position from said commitment velocity, and a third quantity equal to the distance required for said aircraft to reach a position where it will have attained its take-off velocity;

means for comparing said first and second quantities with the total safe runway distance available for take-off and for comparing said third quantity with a distance equal to the total runway distance less the minimum climb-out distance required for said aircraft to take off with the loss of a single engine and still clear a preselected height at the end of said runway; and means responsive to said comparing means for displaying operating information to the crew of said aircraft during the take-off run of said aircraft.

3. An aircraft take-off monitoring ssytem in accordance with claim 2 wherein said computing means includes means for correcting said acceleration measurement for the effects of pitching motions on said aircraft during its take-off run.

4. An aircraft take-off monitoring system in accordance with claim 3 wherein said computing means further includes means for correcting said acceleration measurement for the effects of the acceleration of said aircraft due to gravity during its take-off run.

5. An aircraft take-off monitoring system in accordance with claim 3 wherein said gravity correction means further includes means for adjusting said gravity computation in accordance with the average slope of the runway on which said aircraft is making its take-off run.

6. An aircraft take-off monitoring system in accordance with claim 2 wherein said high speed computer means includes a first high speed computer for computing pedicted output values of the distance traveled by said aircraft to reach its present position, the distance said aircraft will have traveled when it reaches its commitment velocity and the distance said aircraft will have traveled when it reaches its take-off velocity;

a second high speed computer for computing the predicted output values of the distance required for said aircraft to stop at its present velocity and the distance required for said aircraft to stop at its commitment velocity; and means responsive to said real-time and to said first and second high speed computer means for determining said first, second and third quantities.

7. An aircraft take-off monitoring system in accordance with claim 6 wherein said predicted output values computed by said first and said second computers are corrected for the effects of wind velocity.

8. An aircraft take-off monitoring system in accordance with claim 6 wherein said first and said second computer means further include a plurality of gating circuits; and means for controlling the operation of said gating circuits to cause said computer means to compute said predicted output values cyclically at a controllable rate.

9. An aircraft take-off monitoring system in accordance with claim 2 wherein said display means includes an indicator means adapted to be placed in a first state to indicate that take-off should be continued and adapted to be placed in a second state to indicate that said take-off should be aborted.

10. An aircraft take-off monitoring system in accordance with claim 9 wherein said indicator means includes means for further providing an indication of the margin of operating safety of said aircraft in said first state.

11. An aircraft take-off monitoring system in accordance with claim 10 wherein said indicator means comprises an electron-ray tube having a fluorescent pattern the area of which is controlled in response to the comparison of said third quantity with said total runway distance less said climb-out distance.

12. An aircraft take-off monitoring system in accordance with claim 9 wherein said display means further includes means for indicating conditions in which emergency stopping action must be taken to abort the take-off of said aircraft.

13. An aircraft take-off monitoring system in accordance with claim 9 wherein said display means further includes means for indicating when the coefficient of braking friction of said aircraft exceeds a predetermined maximum value.

14. An aircraft take-off monitoring system comprising means for obtaining a first quantity representing the distance traveled by said aircraft to reach its present position on a runway plus the predicted distance required to stop from said position from the present velocity of said aircraft;

means for obtaining a second quantity representing the predicted distance required for said aircraft to reach a position on said runway when it will have attained a preselected commitment velocity plus the predicted distance required to stop from said position from said commitment velocity;

means for obtaining a third quantity representing the predicted distance required for said aircraft to reach a position on said runway where it will have attained its take-off velocity;

means for indicating that take-off should be continued
  (a) when during the time period when the present velocity of said aircraft is less than or equal to said commitment velocity each of said first and said second quantities is less than or equal to a fourth quantity representing the total safe runway distance available for take-off and said third quantity is less than or equal to a fifth quantity representing the total runway distance less the minimum climb-out distance required for said aircraft to take off with the loss of a single engine and still clear a pre-selected height at the end of said runway; and
  (b) when during the time period when said present velocity is greater than said commitment velocity said third quantity is less than or equal to said fifth quantity;

means for indicating that said take-off should be discontinued
  (a) when during the time period when said present velocity is less than or equal to said commitment velocity either one of said first or said second quantities is greater than said fourth quantity;
  (b) when during the time period when said present velocity is less than or equal to said commitment velocity said third quantity is greater than said fifth quantity; and
  (c) when during the time period when said present velocity is greater than said commitment velocity said first quantity is less than or equal to said fourth quantity and said third quantity is greater than said fifth quantity; and means for indicating that emergency action should be taken to discontinue said take-off when during the time period when said present velocity is greater than said commitment velocity said first quantity is greater than said fourth quantity and said third quantity is greater than said fifth quantity.

References Cited

UNITED STATES PATENTS

| | | | |
|---|---|---|---|
| 3,048,329 | 8/1962 | Berggren | 235—150.22 |
| 3,077,110 | 2/1963 | Gold | 235—150.22 XR |
| 3,111,577 | 11/1963 | De Graffenried | 340—27 XR |

ALVIN H. WARING—Primary Examiner

U.S. Cl. X.R.

73—178; 235—150.22